June 23, 1959 — J. H. SWINT — 2,891,347
FLY SWATTER
Filed Feb. 21, 1956
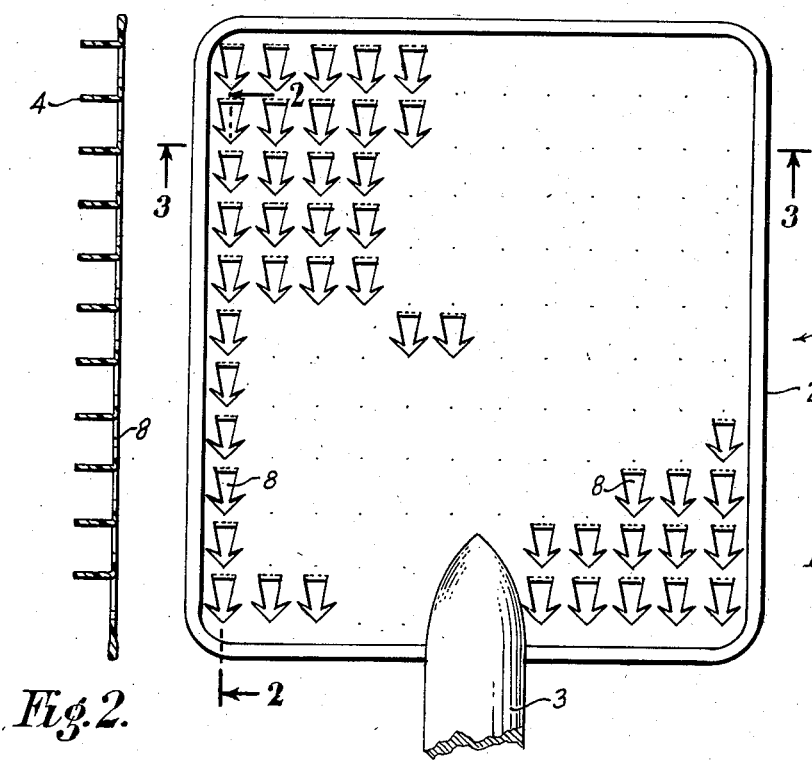
Fig.1.
Fig.2.
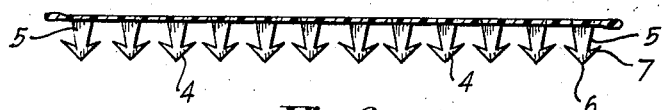
Fig.3.
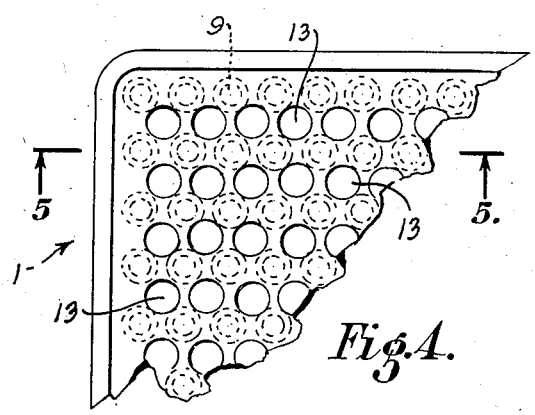
Fig.4.
Fig.5.
INVENTOR.
John H. Swint
BY A. Schapp
ATTORNEY

United States Patent Office 2,891,347
Patented June 23, 1959

2,891,347
FLY SWATTER

John H. Swint, Santa Rosa, Calif.

Application February 21, 1956, Serial No. 566,857

2 Claims. (Cl. 43—137)

The present invention relates to improvements in fly swatters, and its principal object is to provide a swatter of the character described which will catch a fly or other insect, rather than smash it.

In the present invention, it is proposed to provide a swatter arranged in such a manner that it will catch the fly while swatting it, so as to avoid smears on the surfaces or walls, furniture and the like, and to cause the fly to become entangled in the swatter and to be carried away by the latter.

More particularly, it is proposed to provide a fly swatter with a series of hooks on its active face, so as to cause the fly to be caught between the face of the swatter and the hooks.

It is still further proposed to provide the hooks in the form of barbed arrowheads, with the barbs arranged to catch the fly, and to cause the latter to be carried away by the swatter.

It is additionally proposed to provide an arrangement whereby the arrowheads are struck out of the sheet of material forming the body of the swatter and leave correspondingly shaped holes or perforations in the sheet which additionally form traps for the fly below the arrowheads.

Further objects and advantages of my invention will appear as the specification proceeds, and the new and novel features of my invention will be fully defined in the claims attached hereto.

The preferred form of my invention is illustrated in the accompanying drawings, forming part of this application, in which:

Figure 1 shows a plan view of the fly swatter, viewing it from the rear face;

Figure 2, a section taken along line 2—2 of Figure 1;

Figure 3, a section taken along line 3—3 of Figure 1;

Figure 4, a fragmentary plan view of a modified form of my invention; and

Figure 5, a fragmentary section taken along line 5—5 of Figure 4.

While I have shown only the preferred forms of the invention, I wish to have it understood that various changes or modifications may be made within the scope of the claims hereto attached, without departing from the spirit of the invention.

Referring to the drawing in detail, Figure 1 shows the fly swatter 1 as comprising a body portion 2 and a handle 3 projecting sidewise therefrom and in the plane thereof, the handle being shown broken away.

The body portion is manufactured from a sheet of any suitable material, such as thin metal or plastic, preferably squared, with rounded corners, or any other suitable or conventional form, the sheet having the inherent flexibility common to fly swatters to flex against the object to be struck.

The active face of the sheet has a number of hooks 4 projecting therefrom, the hooks being preferably made in the form of arrowheads having tapered stems 5, pointed ends 6 and barbs 7 projecting rearwardly from the points. They are preferably struck out of the sheet material, so as to leave arrow-shaped openings 8 adjacent the arrowheads.

The hooks or arrowheads are preferably arranged in spaced and parallel rows, as shown, with the barbs alined in the transverse rows, as shown in Figure 3, and the arrow-shaped openings disposed between the transverse rows.

Since the openings are also arrow-shaped and provided with barbs, they form additional means for entangling the fly caught between the arrowheads.

While my arrowhead arrangement has been shown as the preferred and probably the most practical form of my invention, it should be understood that the heart of the invention resides in the provision of suitable hooks projecting from the active face of the swatter to catch the fly, rather than smash it, with suitable holes in the sheet to serve as air passages.

A modified form of my invention, for instance, is shown in Figures 4 and 5, in which the hooks 9 are made in the form of conical stems 10 having conical heads or barbs 11 secured upon the free ends thereof.

In this form of my invention, the base of each barb might be serrated, as at 12, or otherwise deformed to entangle the fly, and the air-openings 13 might be round, as shown, or of any other suitable form designed to perform the function of enmeshing the fly.

In operation, when my invention is used to swat a fly, one of the arrowheads may make a direct hit and pierce the fly, in which case the barbs will firmly anchor in the fly and carry the same away from the wall or other supporting face, without leaving a mark.

If there is no direct hit, the fly will be caught between the barbs of adjacent arrowheads or in the barbed perforations between the lines of arrowheads and will also become entangled and trapped without making a smear on the wall or the like.

It will be understood that the method of manufacturing my fly swatter, particularly in its preferred form, is very simple, since all the arrow heads may be pressed out of the sheet material in a single operation and this operation automatically produces the openings, which, in turn, play their part in the trapping of the fly.

I claim:

1. A fly swatter of the character described, comprising a thin sheet of flexible material having a handle projecting sidewise from one edge thereof and having a series of arrowhead-shaped elements projecting from one face thereof, the arrowhead-shaped elements having barbs spaced from the face of the sheet and with respect to each other appropriately to trap a fly between the barbs and the face of the sheet, said sheet having a series of arrowhead-shaped openings therein of the same form as said elements to serve as air passages and to further serve as entangling means for a fly trapped as aforesaid.

2. A fly swatter of the character described, comprising a thin sheet of flexible material having a handle projecting sidewise from one edge thereof and having a series of barbed hook members projecting from one face thereof, the barbs of the hook members being spaced from the face of the sheet and with respect to each other appropriately to trap a fly between the barbs and the face of the sheet, said sheet having a series of openings therein to serve as air passages and to further serve as entangling means for a fly trapped as aforesaid.

References Cited in the file of this patent

UNITED STATES PATENTS

| | | |
|---|---|---|
| Re. 15,154 | Gomber | July 19, 1921 |
| 1,428,703 | Nicolussi | Sept. 12, 1922 |
| 1,650,548 | Sullivan | Nov. 22, 1927 |
| 1,861,378 | Bloodgood | May 31, 1932 |
| 2,093,659 | Kahler | Sept. 21, 1937 |
| 2,099,908 | Rosengarten | Nov. 23, 1937 |
| 2,601,487 | Zilinsky | June 24, 1952 |

FOREIGN PATENTS

| | | |
|---|---|---|
| 815,072 | Germany | Sept. 27, 1951 |